United States Patent Office 3,631,104
Patented Dec. 28, 1971

3,631,104
CATALYSTS FOR THE HYDRATION OF
NITRILES TO AMIDES
Clarence E. Habermann and Ben A. Tefertiller, Midland, Mich., assignors to The Dow Chemical Company, Midland, Mich.
No Drawing. Continuation-in-part of application Ser. No. 791,807, Jan. 16, 1969. This application June 23, 1969, Ser. No. 835,765
Int. Cl. C07c 103/00
U.S. Cl. 260—561 N                       29 Claims

ABSTRACT OF THE DISCLOSURE

Copper, copper oxide, copper-chromium oxide, copper-molybdenum oxide or mixtures thereof have been found to be excellent heterogeneous catalysts for the conversion of nitriles in the presence of water to the corresponding amides. Using one such catalyst in a continuous flow reactor, acrylonitrile was almost 100% converted to acrylamide during more than six weeks of continuous operation.

CROSS-REFERENCE TO RELATED APPLICATIONS

This is a continuation-in-part of our corresponding application Ser. No. 791,807 filed Jan. 16, 1969.

BACKGROUND OF THE INVENTION

Watanabe, in Bull. Chem. Soc. Japan, 37, 1325 (1964), teaches the conversion of benzonitrile to benzamide with precipitated copper and Urushibara copper (U—Cu). The precipitated copper was prepared from a cupric chloride solution and zinc dust and was reacted with benzonitrile in water for 8 hours to give a 7% yield of benzamide. U—Cu—A was prepared by mixing zinc dust with a solution of cupric chloride and then leaching the resultant product with 13% acetic acid. The reaction of benzonitrile in water with U—Cu—A for 8 hours gave a 24% yield of benzamide with no recovery of benzonitrile.

Watanabe et al., in Bull. Chem. Soc. Japan, 39, 8 (1966) also show the use of a copper chromium oxide catalyst, $Cu—CrO_2$, to convert benzonitrile to benzamide. Although the preparation is not disclosed, Watanabe's catalyst apparently was not prepared according to the present invention since benzonitrile in water reacted in the presence of the catalyst for 8 hours gave only a 20% yield of benzamide.

Copper-chromium oxides may be generally referred to as Adkins catalysts, so named after a pioneer in the field, Homer Adkins. The oxides may be prepared by a number of different procedures—for example, by the decomposition of copper ammonium chromate, by the decomposition of copper ammonium chromium carbonates, by the decomposition of copper-chromium nitrates or by grinding or heating together copper oxide and chromium oxides. Although the products of these reactions are generally regarded to be composed of copper oxide and chromium oxide of the general formula $CuCr_2O_4$, Stroupe, in J.A.C.S. 71, 569 (1949) indicates that the exact nature of such copper-chromium oxides is not known. Any preparation that produces copper oxide in combination with chromium oxide apparently is acceptable to prepare such Adkins catalysts, with the product formed by the decomposition of the copper ammonium chromate being one of the best since the product is very finely divided.

The copper ammonium chromate salts may be prepared by mixing aqueous solutions containing molar equivalent amounts of copper nitrate and ammonium chromate. The precipitate thus formed is recovered and when slightly heated decomposes spontaneously with the evolution of heat to form copper-chromium oxide. A barium, calcium or magnesium compound may also be added before precipitation as a stabilizer.

The preparation of various copper-chromium oxides is taught by Connor et al. in J.A.C.S. 54, 1138, (1932), Young et al. in U.S. Pat. 2,575,403, Kirsch et al. in U.S. Pat. 2,964,579, Adkins et al. in J.A.C.S. 72, 2626 (1950) and Groger, Z. Anorg. Chem., 58, 412 (1908); 76, 30 (1912).

At the present time, the principal method of producing acrylamide on an industrial scale is the acid-catalyzed hydration of acrylonitrile. The great disadvantages of this acid process have been the accompanying sulfate pollution and large amount of sulfuric acid wasted. Some acrylamide plants recover the waste sulfuric acid in the form of ammonium sulfate, but others neutralize and dispose of the waste acid. The problem of disposal, the problem of pollution and the expense of the wasted sulfuric acid have created a search for a better method of preparing acrylamide which does not have the disadvantages of the acid process.

SUMMARY OF THE INVENTION

It has now been found that aliphatic nitriles may be reacted to form the corresponding amides by contacting the nitrile in the presence of water with a cupreous catalyst of copper, copper oxide, copper-chromium oxide, copper-molybdenum oxide or mixtures thereof, and that the effectiveness of the oxide catalysts for the hydration of either aliphatic or aromatic nitriles is greatly increased by partially reducing the oxide catalysts before or during their use.

After contact with the catalyst, the amide is recovered from any unconverted reactants and by-products by any conventional method, or alternatively, because both the conversion and yield approach 100% under optimum conditions, the product stream is used without separation or purification.

The cupreous catalysts of the present invention may suitably be copper, copper oxide, copper-chromium oxide, copper-molybdenum oxide or mixtures thereof with copper, copper oxide or copper-chromium oxide or mixtures thereof being preferred. The oxide catalysts may be used as such or they may be stabilized with compounds containing barium, calcium, magnesium, or other stabilizing material. Any of the catalysts may also be supported on alumina, silica, Kieselguhr, pumice, diatomaceous earth or other essentially inert support.

The copper catalyst of the invention may be any conventional form of copper. Such copper metal catalysts may be purchased commercially or prepared by a number of known methods. Suitably such copper catalysts may be prepared by reducing copper oxide, by decomposing and reducing copper salts, such as, copper acetate, copper carbonate, copper hydroxide and copper oxalate or by reducing other copper salts, such as, copper halide, copper nitrate and copper sulfate. Copper catalysts prepared by reducing copper oxide are preferred.

The copper oxide catalyst of the invention may be either cupric oxide, cuprous oxide or a mixture of the two. Both of the oxides are well known and may be obtained commercially or prepared by the decomposition of copper hydroxide, copper carbonate, copper oxalate, copper acetate or another decomposable copper salt.

The copper-chromium oxide catalysts of the invention may be purchased commercially or prepared by a number of known methods, for example, by the decomposition of copper ammonium chromate, by the decomposition of copper ammonium chromium carbonates, by the decomposition of copper-chromium nitrates, or by grinding and heating copper oxides and chromium oxides together. For purpose of definition, the copper content of such catalysts may be present in the plus one or plus two oxidation state. These catalysts, generally considered to be mixtures of copper oxide and chromium oxide, may be used as such or may be reduced as described below.

The copper-molybdenum oxide catalysts of the invention may be prepared in a manner similar to the copper-chromium oxides, for example, a copper-molybdenum oxide catalyst may be prepared by decomposing the precipitate formed upon mixing an aqueous solution of copper nitrate with an aqueous solution of ammonium molybdate. Other methods for preparing copper-molybdenum oxides, such as precipitation of soluble copper and molybdenum salts by a carbonate, may also be used. These catalysts, generally considered to be mixtures of copper oxide and molybdenum oxide, may be used as such or may be reduced as described below.

Preferred catalysts of the invention are combinations consisting essentially of 10 to 90% by weight of copper oxide and 10 to 90% by weight of chromium oxide or molybdenum oxide. Those catalysts containing 10 to 90% by weight of copper oxide and 10 to 90% by weight of chromium oxide are especially preferred.

Reduced copper oxide, reduced copper-chromium oxide, reduced copper-molybdenum oxide and unreduced copper-molybdenum oxide or mixtures thereof are not only effective for converting aliphatic nitriles but are also effective for converting aromatic nitriles to be corresponding amide. Of these catalysts, reduced copper oxide or reduced copper-chromium oxide is preferred, with catalysts which contained 10 to 90% by weight copper oxide and 10 to 90% by weight chromium oxide before reduction being especially preferred.

The reduction of the respective oxides to produce the corresponding reduced copper oxide, reduced copper-chromium oxide and reduced copper-molybdenum oxide is generally accomplished by an ordinary hydrogen reduction although other methods of reduction may be used. In such hydrogen reduction, the copper oxide, copper-chromium oxide or copper-molybdenum oxide is contacted with elemental hydrogen at the appropriate temperature to give the desired reduction.

In the reduction of copper oxide and copper-chromium oxide, the reaction conditions are generally adjusted to reduce only copper oxide, chromate, $Cr_2O_4^=$, dichromate, $Cr_2O_7^=$ and chromium trioxide, $CrO_3$. Cupric oxide is reduced to either cuprous oxide or elemental copper and cuprous oxide may be at least partially reduced to elemental copper. The small amounts of chromate, dichromate and chromium trioxide present are reduced to chromic oxide, $Cr_2O_3$.

In a hydrogen reduction, the interreationship or temperature, reaction time and quantity of hydrogen used control the amount of reduction and the oxidation state to which the oxide is reduced. To reduce copper oxide, chromate, dichromate and chromium trioxide to cuprous oxide, copper and chromic oxide, temperatures of about 50° to about 500° C. or more may suitably be used with temperatures of about 100° to about 300° C. being preferred. The reaction time and amount of hydrogen used may vary widely. As more reduction is desired, longer reaction times and more hydrogen are employed.

The reduction of the oxide to the desired catalyst may be monitored and controlled by measuring either the quantity of hydrogen absorbed or the amount of water formed. The progress of the reduction may also be determined by X-ray diffraction, X-ray fluorescence or oxygen analysis.

Generally, as more of the cupric oxide in a catalyst is reduced to cuprous oxide, the activity of the catalyst increases. Therefore, catalysts wherein at least 50% of the copper content has been reduced to cuprous oxide are preferred. Also preferred are catalysts wherein the copper content is essentially cuprous oxide containing a minor amount of copper metal.

Although reduction of the copper oxide, copper-chromium oxide and copper-molydbenum oxide with hydrogen is preferred, other methods of reduction may also be employed to prepare the reduced catalyst. For example, the catalyst may be prepared by contacting the oxide at an elevated temperature with ammonia, hydrazine, carbon, carbon monoxide, a lower alkane, a lower alkanol or other reducing agent.

With proper reduction, the copper oxide and copper-chromium oxide catalysts of the invention are substantially superior catalysts for making amides from nitriles. In addition to the high conversions and yields produced, the catalysts have long effective lives, and little or no deleterious by-products or waste products requiring separation are formed.

Any nitrile may suitably be used in the present invention, with aliphatic and aromatic hydrocarbon nitriles containing up to about 20 or more carbon atoms being preferred. For purpose of the invention, aromatic nitriles are defined as those nitriles having cyano groups attached to the aromatic nucleus. Representative examples of suitable nitriles include: saturated aliphatic hydrocarbon nitriles such as acetonitrile, propionitrile, pentanonitrile, dodecanonitrile, succinonitrile, adiponitrile and the like; unsaturated aliphatic hydrocarbon nitriles such as acrylonitrile, methacrylonitrile, crotonic nitrile, β-phenyl-acrylonitrile, 2-cyano-2-butene, 1-cyano-1-octene, 10-indecenonitrile, maleonitrile, fumaronitrile, and the like; and aromatic nitriles such as benzonitrile, p-toluonitrile, α-napthonitrile, phthalonitrile and the like. Of the nitriles suitable for use in the invention, the olefinic nitriles of 3 to 6 carbon atoms are especially preferred, with the conversion of acrylonitrile to acrylamide being of special interest.

The proportions of nitrile to water in the reactant mixture may vary widely. More important than the specific nitrile to water ratio is the extent of the interaction between the nitrile and water. A high degree of contact is desirable to assure the greatest efficiency in the reaction. For gaseous reactants, the nitrile and water are miscible in all proportions, but for liquid reactants, certain precautions may be necessary to insure that sufficient contact of of the nitrile and water is maintained. The necessary contact may be realized by dissolving the nitrile in the water or by dissolving the water in the nitrile. Outside of the limits of the solubility of one of the reactants in the other, however, the reactant mixture may be agitated, a suitable solvent may be added or another means of increasing the contact of the reactants may be employed. Excess water is the preferred solvent although other inert solvents, such as dioxane, dimethyl sulfoxide, acetone, dimethyl ether of ethylene glycol or tetrahydrofuran, may also be used.

The catalyst of the invention is convenient to use in both a batch process and a continuous flow process. Using either method, the nitrile and water are contacted with the catalyst under the appropriate reaction conditions, and the amide product is then recovered. Since the catalysts of the present invention are essentially insoluble heterogeneous catalysts, a continuous flow reaction is preferred.

In a continuous flow reaction, the solid catalyst of the invention is packed into a reaction chamber having an inlet for reactants and an otulet for products. The reaction chamber is maintained at the desired reaction temperature and the rate of flow of reactants over the catalyst is controlled to give the desired contact of the reactants with the catalyst. The reactants may be fed over the solid catalyst as a gas or preferably as a liquid. The reaction product from the reactor may be used as such or purified by any known technique.

The temperature of the reaction may vary widely as different nitriles are used in the invention. Generally, the reaction is conducted within a temperature range of about 0° to about 400° C. At temperature below this level, the reaction is impractically slow. Above this range, the reaction forms an increasing amount of undesirable by-products. Within the broad temperature range, temperatures of about 25° to about 200° C. are preferred. For unsaturated nitriles which tend to polymerize, a reaction temperature of less than about 200° C. is desirable to avoid polymerization of the nitrile and possible poisoning of the catalyst.

The other reaction conditions are known in the art of using heterogeneous catalysts and are not critical in the invention. The important aspect of the invention is the use of the cupreous catalyst, i.e., copper, copper oxide, copper-chromium oxide and copper-molybdenum oxide, to convert nitriles to the corresponding amides. By applying these catalysts to the reaction, excellent yields of amide and long catalyst life are realized.

SPECIFIC EMBODIMENTS

Example 1.—Preparation, reduction and use of a copper-chromium oxide containing 44% CuO and 56% $Cr_2O_3$ A copper oxide-chromium oxide catalyst for use in the preparation of amides from nitriles was prepared by reacting ammonium chromate with copper chloride. To 25 grams of ammonium dichromate dissolved in 100 ml. of water, 30 ml. of ammonium hydroxide was added to obtain ammonium chromate. To the ammonium chromate solution, a solution of 20.2 grams of cupric chloride dissolved in 150 ml. of water was added slowly with continuous agitation. The resulting precipitate was separated and washed several times with approximately one liter of water each time. The separated precipitate was dried at 100° C. for 8 hours and then heated at 275° C. in air for 3 hours. The precipitate was reduced by a gaseous stream containing 130 cc./min. of hydrogen and 510 cc./min. nitrogen at a temperature of 250° C. for 4 hours to produce the reduced copper oxide-chromium oxide catalyst.

One gram of the catalyst prepared was reacted with 5 grams of a 7% solution of acrylonitrile in water at 135° C. for one hour to give a 72.5% conversion of acrylonitrile with an 87.9% yield of acrylamide.

Example 2.—Reduction and use of a copper-chromium oxide containing 80% CuO and 17% $Cr_2O_3$ About 22 grams of a commercially prepared catalyst containing 80% CuO and 17% $Cr_2O_3$ sold under the trade name Harshaw Cu 0203 was ground and screened to obtain particles of 20–50 mesh size. The ground catalyst was then placed in a nickel boat inside a Pyrex tube, which was heated in a tube furnace. A stream of dry hydrogen was passed through the tube at a rate of 200 cc./min. while the temperature was regulated at 100° C. for 1 hour, 150° C. for the second hour and 175° C. for two additional hours. The catalyst was cooled after the activation, and then an air-argon mixture was passed over the catalyst to prevent rapid oxidation.

A continuous flow reactor was fabricated of stainless steel having a reaction chamber with a volume of 15 cc., a feed reservoir connected to the bottom of the reactor and a product container connected to the top of the reaction chamber. The reaction chamber was packed with 21 g. of the activated catalyst prepared above and the reactor was maintained at a temperature of 85° C. A 7% solution of acrylonitrile in water was passed over the catalyst bed at a rate of 14±0.5 cc./hr. and under sufficient pressure to maintain the liquid phase.

The product solution was collected and cooled to room temperature. Samples were withdrawn from the product every 12 hours in bottles closed with rubber serum caps to prevent evaporation of the acrylonitrile and the sample was analyzed by gas-liquid chromatography using a weighed amount of dioxane as the internal standard.

The reaction was continuously run for over four weeks. During the entire period, yields of acrylamide greater than 96% and yields of β-hydroxypropionitrile less than 1% were obtained. The conversion remained essentially constant at about 100% during the first 100 hours of operation and then decreased linearly to 66% at 700 hours of operation with the same catalyst.

Example 3.—Reduction and use of a copper-chromium oxide containing 42% CuO and 38% $Cr_2O_3$ About 25 grams of a commercially prepared catalyst containing 42% CuO and 38% $Cr_2O_3$ sold under the trade name Harshaw Cu 1808 was activated with hydrogen and tested as described in Example 2. The reaction chamber was packed with 23.5 g. of the activated catalyst and the reactor was maintained at a temperature of 80° C.

Initially, the yield and conversion were only about 50%, and about 30% of the nitrile converted appeared as β-hydroxypropionitrile. However, after about two weeks, the conversion of acrylonitrile and the yield of acrylamide were 90% or better with the formation of less than 1% β-hydroxypropionitrile. Thereafter these values remained essentially constant until the experiment was terminated after more than six weeks of operation.

Example 4.—Reduction and use of a copper-chromium oxide containing 40% Cu and 25.5% Cr In the same manner as described in Example 2, 16 grams of a copper-chromium oxide catalyst containing 40% Cu and 25.5% Cr sold under the trade name Girdler G–13, was activated with hydrogen and tested. The reaction chamber was charged with 14.7 g. of the activated catalyst and the reactor was maintained at 85° C.

Initially, the conversion of acrylonitrile was 47%, the yield of acrylamide was 59% and the yield of β-hydroxypropionitrile was 18%. During the four weeks of operation, the conversion increased to 58% and then decreased to 46%, the yield of acrylamide increased to 96% and the yield of β-hydroxypropionitrile decreased to 3%.

Example 5.—Reduction and use of a copper-chromium oxide containing 32% Cu, 25% Cr and 11% Ba In the same manner as described in Example 2, about 23 grams of an oxide catalyst containing 32% Cu and 25% Cr and 11% Ba sold under the trade name Girdler G–22 was activated with hydrogen and tested. The reactor was packed with 21.5 g. of the activated catalyst and was maintained at 80° C.

Initially, the conversion of acrylonitrile was 73%, the yield of acrylamide was 59% and the yield of β-hydroxypropionitrile was 23%. The conversion decreased to 43% and then rose to 56%, the yield of acrylamide rose to 84% and the yield of β-hydroxypropionitrile decreased to 6% during the 120 hours of operation.

Example 6.—Reduction and use of a copper oxide catalyst containing 9% CuO

In the same manner as described in Example 2, 20 grams of a catalyst containing 99% CuO sold under the trade name Harshaw Cu 0307 was activated with hydrogen and tested. The reactor was packed with 19 g. of the activated catalyst and the reactor was held at 80° C. The reactor was run contniuously for over two weeks during which period the conversion decreased from 75% to 33%, the yield of acrylamide was essentially constant at 91% and the yield of β-hydroxypropionitrile decreased from 3 to 1%.

Example 7.—Use of a copper-chromium oxide catalyst sold under the trade name Calsicat 66–12–49–1B To a glass tube sealed at one end was added 5 grams of 7% by weight solution of acrylonitrile in water and one gram of finely-divided copper chromium oxide catalyst sold under the trade name Calsicat 66–12–49–1B. The tube was sealed and heated for 20 minutes at 155° C. with agitation. The tube was cooled rapidly in an ice bath and an aliquot was analyzed by vapor phase chromatography. The conversion of the acrylonitrile was found to be 45% with a 100% yield of acrylamide.

Example 8.—Reduction and use of a catalyst containing 80% CuO and 17% $Cr_2O_3$ 40.32 grams of the unreduced copper-chromium oxide catalyst of Example 2 was reduced with a 2000 cc./min. gas flow containing 5% $H_2$ and 95% $N_2$ by volume for 6 hours at a temperature of 175° C. for the entire period. Rather than exposing the catalyst to air-argon after reduction, the catalyst was maintained under nitrogen and not exposed to air at anytime. Oxygen was also excluded from the nitrogen used to pressurize the feed solutions and from the water entering the feed.

The reactor of Example 2 was packed with 25.80 g. of the reduced catalyst and run as shown in that Example. For the first 75 hours of operation, the temperature of the reaction was maintained at 75° C., from 75 hours of operation until 412 hours the temperature was 80° C. and from 412 hours to almost 900 hours the temperature was 85° C. Initially, the conversion of acrylonitrile was 96% with a 97% yield of acrylamide while no β-hydroxypropionitrile or other by-products were formed. During the entire five weeks of continuous operation, both the conversion of acrylonitrile and yield of acrylamide were above 90% while no β-hydroxypropiontrile or other by-products were formed.

In the same manner as described in the above examples, other copper-chromium oxides may be used in the present invention, for example, copper-chromium oxides containing 10% copper oxide and 90% chromium oxide, 20% copper oxide and 80% chromium oxide, 60% copper oxide and 40% chromium oxide, and 90% copper oxide and 10% chromium oxide may be prepared and used as such or reduced with hydrogen.

The reduced copper oxide and reduced copper-chromium oxides described above and in the examples may also be reduced with hydrogen under different conditions of reduction. For example, the copper-chromium oxide of Example 2 may be reduced in a closed vessel under a hydrogen pressure of 200 atm. at 180° C. for 30 minutes. As another example, an oxide containing 20% copper oxide and 80% chromium oxide may be reduced in a stream of hydrogen at 250° C. for 3 hours. Likewise, they may also be reduced by other methods of reduction, for example, by a stream of carbon monoxide at a temperature of 200° C. All such catalyst may be used to convert acrylonitrile to acrylamide.

In a similar manner as described above, catalysts containing 10% copper oxide and 90 molybdenum oxide, 50% copper oxide and 50% molybdenum oxide or 90% copper oxide and 10% molybdenum oxide may be prepared and used as such or in the reduced form to convert nitriles to the corresponding amide. Also, mixtures of copper, chromium and molybdenum oxides may be used.

The copper, copper oxide, copper-chromium oxide or copper-molybdenum oxide catalyst described above may be used to convert nitriles other than acrylonitrile to the corresponding amide, for example, the reduced copper-chromium oxide catalyst of Example 3 may be used to convert acetonitrile to acetamide, to convert methacrylonitrile to methacrylamide and to convert benzonitrile to benzamide or the unreduced copper-chromium oxide catalyst of Example 7 could be used to convert other aliphatic nitriles to the corresponding amide, for example butyronitrile to butyramide. The principal by-product of β-hydroxypropionitrile formed with acrylonitrile is not obtained with these other nitriles.

Reactant feeds other than a liquid 7% solution of acrylonitrile in water may also be used, for example, the feed may be a 3% solution of water in acrylonitrile, a mixture of 3 parts of water, 1 part of acrylonitrile and 2 parts of dioxane or a gaseous feed of 4 parts of water and 1 part of acrylonitrile. For reactants other than acrylonitrile, the feed may also vary widely, for example, in the conversion of acetonitrile to acetamide a reactant feed of 2 parts of water to one part of acetonitrile may be employed in a continuous reactor.

We claim:
1. In the process for converting a nitrile to the corresponding amide, the improvement comprising: reacting by contacting an aliphatic nitrile in the presence of water with a heterogeneous, cupreous catalyst consisting essentially of copper prepared by reducing copper oxide, copper oxide, copper-chromium oxide, copper-molybdenum oxide or mixtures thereof.

2. The process of claim 1 wherein the catalyst is copper prepared by reducing copper oxide, copper oxide or copper-chromium oxide.

3. The process of claim 1 wherein the catalyst is essentially 10 to 90% by weight of copper oxide and 10 to 90% of chromium oxide or molybdenum oxide.

4. The process of claim 1 wherein the copper oxide, copper-chromium oxide or copper-molybdenum oxide catalyst is reduced by contact with a reducing agent prior to the conversion of the nitrile to the corresponding amide.

5. The process defined in claim 4 wherein the reducing agent is elemental hydrogen.

6. The process of claim 4 wherein the catalyst is reduced at a temperature of about 50° to about 500° C.

7. The process of claim 6 wherein the catalyst is reduced at a temperature of about 100° to about 300° C.

8. The process of claim 1 wherein at least 50% of the copper content of the catalyst is cuprous oxide.

9. The process of claim 1 wherein the copper content of the catalyst is essentially cuprous oxide containing a minor amount of copper metal.

10. The process of claim 1 wherein the nitrile is an aliphatic hydrocarbon nitrile of up to 20 carbon atoms.

11. The process of claim 10 wherein the nitrile is an olefinic nitrile of 3 to 6 carbon atoms.

12. The process of claim 11 wherein the nitrile is acrylonitrile.

13. The process of claim 1 wherein the temperature is about 0° to about 400° C.

14. The process of claim 13 wherein the temperature is about 25° to about 200° C.

15. The process of claim 1 wherein the reaction is run in the liquid phase.

16. In the process for converting a nitrile to the corresponding amide by contacting the nitrile in the presence of water with a heterogeneous catalyst, the improvement comprising using a cupreous catalyst consisting essentially of reduced copper oxide, reduced copper-chromium oxide, reduced copper-molybdenum oxide, unreduced copper-molybdenum oxide or mixtures thereof.

17. The process of claim 16 wherein the catalyst is reduced copper oxide or reduced copper-chromium oxide.

18. The process of claim 17 wherein the catalyst is a reduced copper-chromium oxide which contained 10 to 90% copper oxide and 10 to 90% chromium oxide before reduction.

19. The process of claim 17 wherein the catalyst was reduced by elemental hydrogen.

20. The process of claim 17 wherein the catalyst was reduced at a temperature of about 50° to about 500° C.

21. The process of claim 17 wherein the catalyst was reduced at a temperature of about 100° to about 300° C.

22. The process of claim 17 wherein at least 50% of the copper content of the catalyst is cuprous oxide.

23. The process of claim 17 wherein the copper content of the catalyst is cuprous oxide containing a minor amount of copper metal.

24. The process of claim 16 wherein the nitrile is an aliphatic or aromatic hydrocarbon nitrile of up to about 20 carbon atoms.

25. The process of claim 24 wherein the nitrile is an olefinic nitrile of 3 to 6 carbon atoms.

26. The process of claim 25 wherein the nitrile is acrylonitrile.

27. The process of claim 16 wherein the temperature is about 0° to about 400° C.

28. The process of claim 27 wherein the temperature is about 25° to about 200° C.

29. The process of claim 16 wherein the reaction is conducted in the liquid phase.

References Cited

UNITED STATES PATENTS

| 3,023,242 | 2/1962 | Bornemann et al. | 260—561 |
| 3,381,034 | 4/1968 | Greene et al. | 260—557 |

LEWIS GOTTS, Primary Examiner

E. G. LOVE, Assistant Examiner

U.S. Cl. X.R.

260—404, 558 R, 561 R